(12) United States Patent
Kim et al.

(10) Patent No.: US 9,469,092 B2
(45) Date of Patent: Oct. 18, 2016

(54) MANUFACTURING METHOD OF WHEEL GUARD

(71) Applicants: Hyundai Motor Company, Seoul (KR); Iksung Co., Ltd., Eumseong-gun (KR)

(72) Inventors: Min Su Kim, Ulsan (KR); Young In Kim, Ulsan (KR); Jaechan Lim, Ulsan (KR); Ki-Wook Yang, Cheongwon-gun (KR); Kue-Seok Kang, Cheongwon-gun (KR); Jong Hyuk Cha, Eumseong-gun (KR); Bong jik Lee, Seongnam-si (KR); Chang Hyeon Kim, Eumseong-gun (KR)

(73) Assignees: Hyundai Motor Company, Seoul (KR); Iksung Co., Ltd., Eumseong-gun (KR)

( * ) Notice: Subject to any disclaimer, the term of this patent is extended or adjusted under 35 U.S.C. 154(b) by 27 days.

(21) Appl. No.: 14/488,025

(22) Filed: Sep. 16, 2014

(65) Prior Publication Data

US 2015/0166119 A1     Jun. 18, 2015

(30) Foreign Application Priority Data

Dec. 17, 2013    (KR) .......................... 10-2013-0157572

(51) Int. Cl.
| | | |
|---|---|---|
| *B62D 25/16* | (2006.01) | |
| *B32B 37/15* | (2006.01) | |
| *B32B 38/00* | (2006.01) | |
| *B60R 13/08* | (2006.01) | |

(52) U.S. Cl.
CPC ......... *B32B 38/0012* (2013.01); *B32B 37/153* (2013.01); *B60R 13/0861* (2013.01); *B62D 25/161* (2013.01); *B32B 2305/18* (2013.01); *B32B 2605/00* (2013.01); *Y10T 156/1043* (2015.01)

(58) Field of Classification Search
None
See application file for complete search history.

(56) References Cited

U.S. PATENT DOCUMENTS

| | | | | |
|---|---|---|---|---|
| 2005/0126848 A1* | 6/2005 | Siavoshai | ........... | B60R 13/0815 181/207 |
| 2007/0202302 A1* | 8/2007 | Matsuura | ................ | B32B 3/085 428/174 |

FOREIGN PATENT DOCUMENTS

| | | |
|---|---|---|
| JP | 3121698 U | 5/2006 |
| KR | 10-0768824 B1 | 10/2007 |
| KR | 10-2011-0029369 A | 3/2011 |
| KR | 10-1069903 B1 | 10/2011 |

* cited by examiner

*Primary Examiner* — Barbara J Musser
(74) *Attorney, Agent, or Firm* — Morgan, Lewis & Bockius LLP

(57) ABSTRACT

A method of manufacturing a wheel guard may include injection-molding an adhesive layer, bonding an outer layer including a non-woven fabric and a sound-absorbing layer including thermoplastic resin with the adhesive layer in between, and forming the layers into a predetermined shape of the wheel guard, with the outer layer and the sound-absorbing layer bonded by the adhesive layer. The thickness of the outer layer may be 2 to 10 mm, the thickness of the adhesive layer may be 0.1 to 2 mm, and the thickness of the sound-absorbing layer may be 2 to 10 mm, before the bonding. A specific heat treatment layer may be formed on a non-adhesive side of the outer layer and may have an LM FIBER, a film, or a sheet.

8 Claims, 8 Drawing Sheets

FIG. 6

| Outer layer | Kind of non-woven fabric | 5~10t |
|---|---|---|
| Adhesive layer | Kind of adhesive | 1~2t |
| Sound-absorbing layer | Kind of thermoplastic resin (ex. PET) | 5~10t |
| Heat treatment side of outer layer | LM FIBER, sheet, or film | |

MANUFACTURING METHOD OF WHEEL GUARD

CROSS-REFERENCE TO RELATED APPLICATION

The present application claims priority of Korean Patent Application Number 10-2013-0157572 filed on Dec. 17, 2013, the entire contents of which application are incorporated herein for all purposes by this reference.

BACKGROUND OF INVENTION

1. Field of Invention

The present invention relates to a method of manufacturing a wheel guard which simplifies a manufacturing process and reduces weight of a wheel guard, and effectively blocks road noise generated between a tire and a road while a vehicle is in motion.

2. Description of Related Art

In general, while a vehicle is in motion, flows of air are generated around the vehicle body, in which the influence on the air around the tires is not negligible. Turbulence and vortexes are mixed complicatedly in three dimensions by the flows of air around tires, such that, as a measure against this problem, wheel guards are disposed around tires to cover them.

FIG. 7 is a perspective view showing a portion of a vehicle and FIG. 8 is a perspective view of a wheel guard mounted on a vehicle. Referring to FIG. 7, a vehicle includes a vehicle body panel 2, a bumper 3, a tire 1, and a wheel guard 10. The wheel guard 10, which is made of hard or soft polypropylene resin, is disposed between the tire 1 and the vehicle body panel 2 and prevents dirt from moving to the vehicle body 2.

The automotive wheel guard 10, which was formed by injection molding of polypropylene (PP) resin, is preheated for easy forming. After injection molding of polypropylene resin, they are bonded by vibration welding or high frequency welding and then a specific acoustic absorbent is attached to the back of the wheel guard through a double-sided tape, thereby completing the product.

Since the automotive wheel guard 10 was manufactured with stress on the external appearance, it cannot effectively remove road noise generated while a vehicle is in motion, such that road noise due to friction between a tire and a road is transmitted to the interior of a vehicle and may deteriorate the ability against vibration noise especially of the back seats.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method of manufacturing a wheel guard which can improve abilities of sound absorption, sound insulation, and wear resistance, reduce dust from being produced by smoothly coating the surface of an outer layer, and improve the entire durability.

Various aspects of the present invention provide a method of manufacturing a wheel guard which may include: injection-molding an adhesive layer; bonding an outer layer including a non-woven fabric and a sound-absorbing layer including thermoplastic resin with the adhesive layer therebetween; and forming the layers into a predetermined shape of the wheel guard, with the outer layer and the sound-absorbing layer bonded by the adhesive layer.

The thickness of the outer layer may be 2 to 10 mm, the thickness of the adhesive layer may be 0.1 to 2 mm, and the thickness of the sound-absorbing layer may be 2 to 10 mm, before the bonding.

A specific heat treatment layer may be formed on a non-adhesive side of the outer layer and may have an LM (Low Melting) FIBER, a film, or a sheet. The heat treatment layer may be heat-treated through a heating roller. The heat treatment layer may include one of thermoplastic resin, thermosetting resin, a thermoplastic compound, or a thermosetting compound.

The outer layer and the sound-absorbing layer may be bonded under pressure by two rollers when being bonded through the adhesive layer and the adhesive layer may be integrally absorbed in the outer layer.

The heat treatment temperature of the heat treatment layer bonded to the outer layer may be higher than the melting point of the heat treatment layer. The heat treatment layer bonded on the non-adhesive side of the outer layer may be heat-treated before the outer layer is bonded with the sound-absorbing layer. The heat treatment layer bonded on the non-adhesive layer of the outer layer may be heat-treated after the outer layer is bonded with the sound-absorbing layer. The outer layer and the sound-absorbing layer may be bonded through the adhesive layer and then cooled through a cooling roller.

According to the present invention, since three layers including an outer layer that is a kind of non-woven fabric, an adhesive layer, and a sound-absorbing layer that is a kind of thermoplastic resin are formed, the abilities of sound absorption, sound insulation, and wear resistance can be improved.

Further, the surface of the outer layer can be made smooth by bonding an LM FIBER, a sheet, or a film on the outer layer and performing thermal planarizing, such that it is possible to reduce production of dust by the coating and improve the entire durability.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a table showing exemplary features of a fabric for manufacturing a wheel guard according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
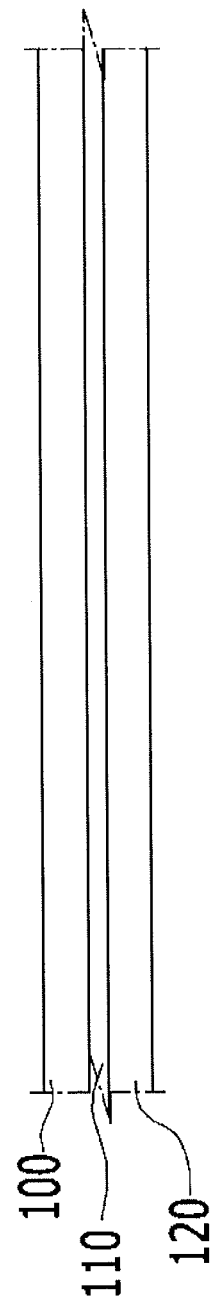
FIG. 1 is a cross-sectional view showing a portion of an exemplary board for manufacturing a wheel guard according to the present invention.

FIG. 1 is a cross-sectional view showing a portion of a board for manufacturing a wheel guard according to various embodiments of the present invention and FIG. 6 is a table showing features of a fabric for manufacturing a wheel guard according to various embodiments of the present invention. Referring to FIGS. 1 to 6, a board for manufacturing a wheel guard includes an outer layer 100, an adhesive layer 110, and a sound-absorbing layer 120.

The outer layer 100 is a kind of non-woven fabric and of which the fabric is 2 to 10 mm thick, the adhesive layer 110 is a kind of adhesive and of which the fabric is 0.1 to 2 mm thick, and the sound-absorbing layer 120 is thermoplastic resin such as PET and of which the fabric is 2 to 10 mm thick.

The outer layer 100 and the sound-absorbing layer 120 are bonded by pressure through the adhesive layer 110, in which the adhesive layer 110 is integrally absorbed in the outer layer 100 that is a kind of non-woven fabric and the outer layer 100 and the sound-absorbing layer 120 are attached to each other.

A heat treatment layer 405 (see FIG. 4) formed on the non-adhesive side of the outer layer 100 may include an LM (Low Melting) FIBER, a film, or a sheet and may include ones that are mixed with or bonded to the surface of the outer layer in thermoplastic resin, thermosetting resin, a thermoplastic compound, and a thermosetting compound.

Figure 2:
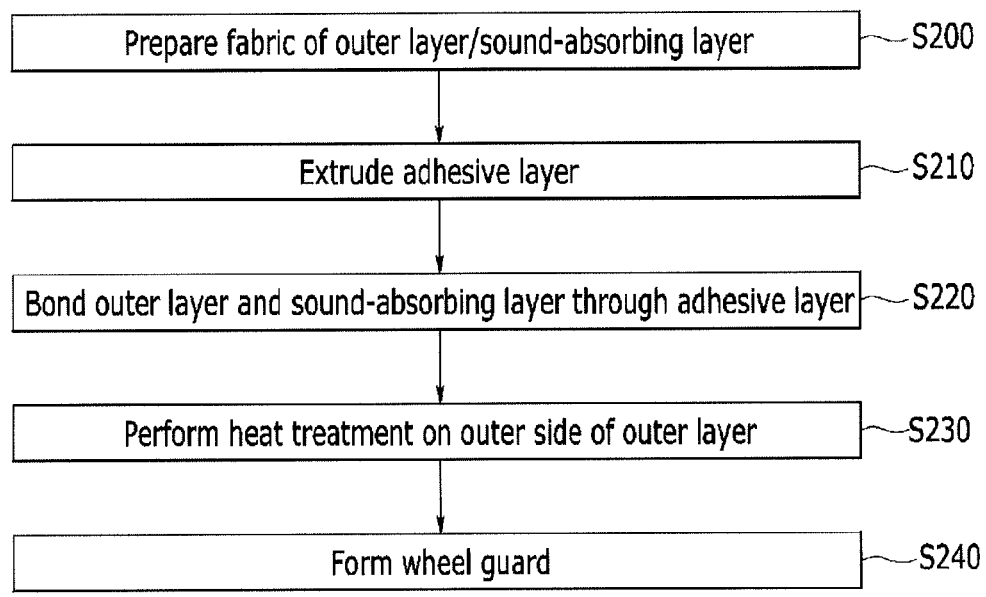
FIG. 2 is a flowchart illustrating an exemplary method of manufacturing a wheel guard according to the present invention.

FIG. 2 is a flowchart illustrating a method of manufacturing a wheel guard according to various embodiments of the present invention. Referring to FIG. 2, the fabrics of the outer layer 100 and the sound-absorbing layer 120 are prepared in S200, the adhesive layer 110 is extruded in S210, the outer layer 100 and the sound-absorbing layer 120 are bonded through the adhesive layer 110 in S220, and the heat treatment layer 405 on the outer layer 100 is heat-treated in S230. A wheel guard is formed into a predetermined shape by a mold etc. in S240.

In various embodiments of the present invention, the heat treatment layer 405 of the outer layer 100 may be heat-treated after the outer layer 100 and the sound-absorbing layer 120 are bonded, or the heat treatment layer of the outer layer may be heat-treated before the outer layer 100 and the sound-absorbing layer 120 are bonded. The heat treatment on the outer layer in S230 is described in detail with reference to FIG. 4.

Figure 3:
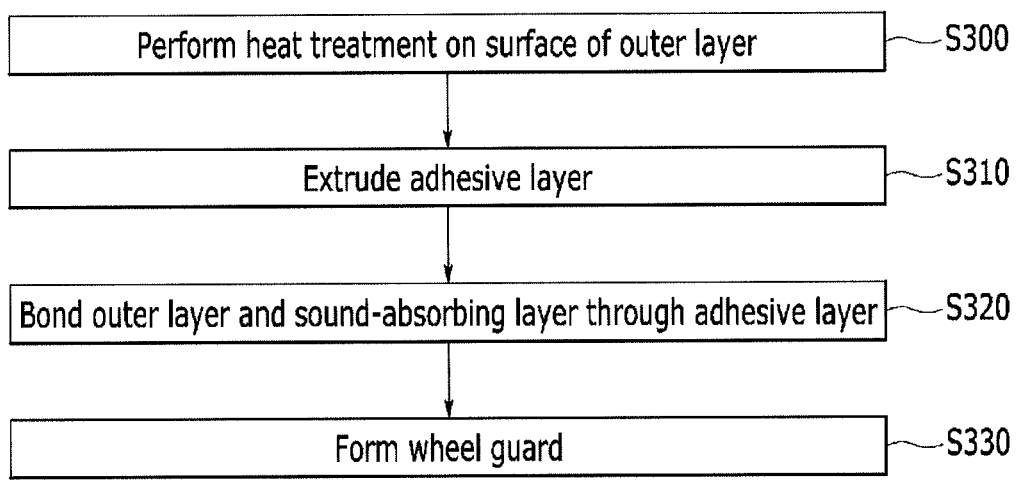
FIG. 3 is a flowchart illustrating an exemplary method of manufacturing a wheel guard according to the present invention.

FIG. 3 is a flowchart illustrating a method of manufacturing a wheel guard according to various embodiments of the present invention. Referring to FIG. 3, the heat treatment layer 405 on the outer layer 100 is heat-treated in S300, the adhesive layer 110 is extruded in S310, and the outer layer 100 and the sound-absorbing layer 120 are bonded through the adhesive layer 110 in S320. A wheel guard is formed in a predetermined shape by a mold etc. in S330. The heat treatment on the outer layer in S300 is described with reference to FIG. 4.

Figure 4:
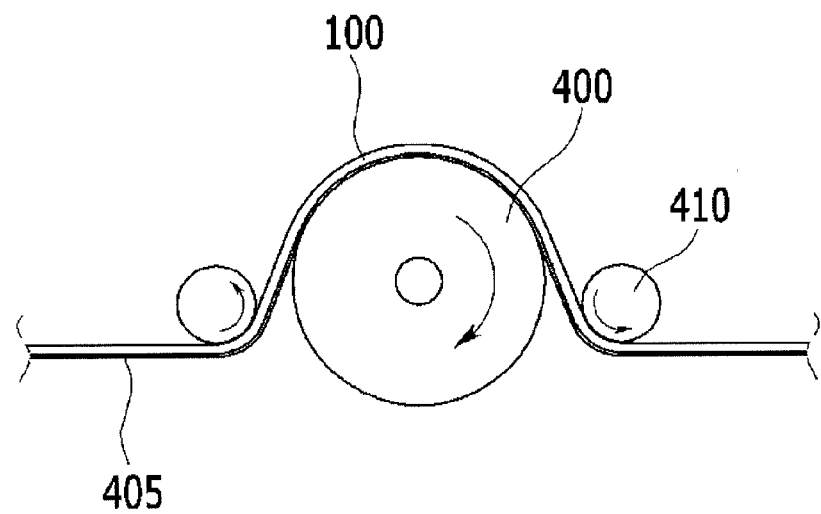
FIG. 4 is a view showing a process of performing heat treatment on an outer layer in an exemplary method of manufacturing a wheel guard according to the present invention.

FIG. 4 is a view showing a process of performing heat treatment on an outer layer in the method of manufacturing a wheel guard according to various embodiments of the present invention. Referring to FIG. 4, the heat treatment layer 405 is formed on the non-adhesive side of the outer layer 100, a heating roller 400 is disposed to perform heat treatment on the heat treatment layer 405, guide rollers 410 are disposed at both sides of the heating roller 400 in parallel with it.

Because the surface temperature of the heating roller 400 is higher than the melting point of the heat treatment layer 405, some fiber of the fabric, film, or sheet of the heat treatment 405 is melted and the surface of the heat treatment 405 is coated.

Accordingly, the entire durability of the outer layer 100 is improved and the surface is made smooth. In various embodiments of the present invention, the diameter, temperature, contact area, and rotation speed of the heating roller 400 should be considered to planarize the heat treatment layer 405 of the outer layer 100.

In various embodiments of the present invention, a kind of fiber board PET (lower melting fiber+PET fiber) may be used for the outer layer 100 that is a kind of non-woven fabric, and its surface features can be improved by thermal planarization through the heating roller 400.

The outer layer 100 should keep the sound-absorbing ability without damage to the external appearance after heat treatment and it may be formed by mixing an LM FIBER and a REGULAR FIBER for heat treatment or surface treatment.

The heat treatment layer 405 on the outer layer 100, which has a predetermined thickness, may include an LM FIBER, a film, or a sheet and may be bonded to the outer layer by performing needle punching or thermal planarizing with the LM FIBER, film, or sheet on the outer layer 100.

Figure 5:
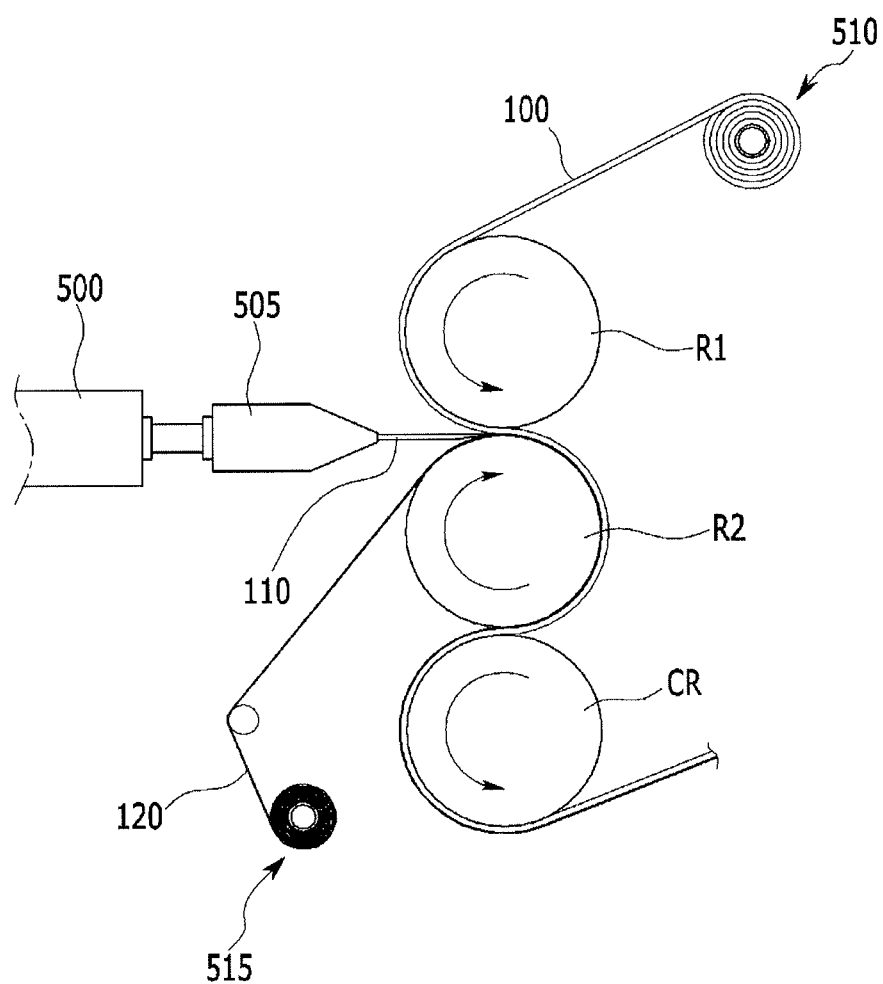
FIG. 5 is a view generally showing an exemplary apparatus and an exemplary method of manufacturing a wheel guard according to the present invention.
Figure 7:
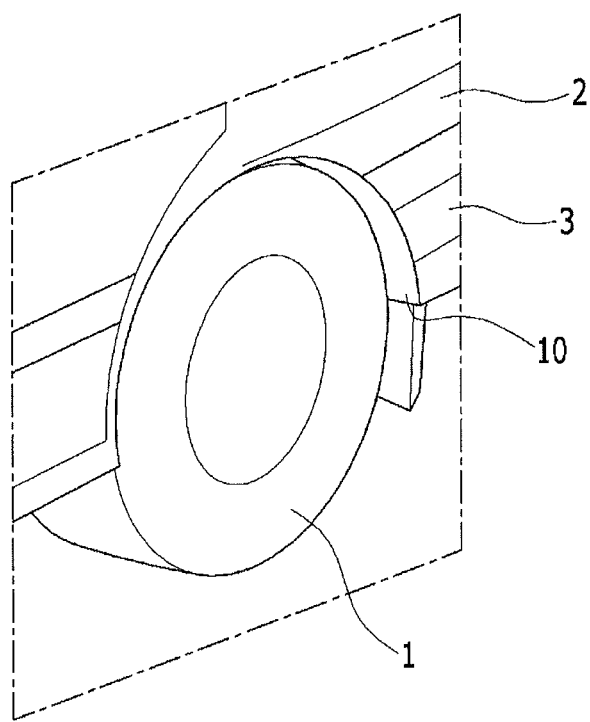
FIG. 7 is a perspective view showing a portion of a vehicle.
Figure 8:
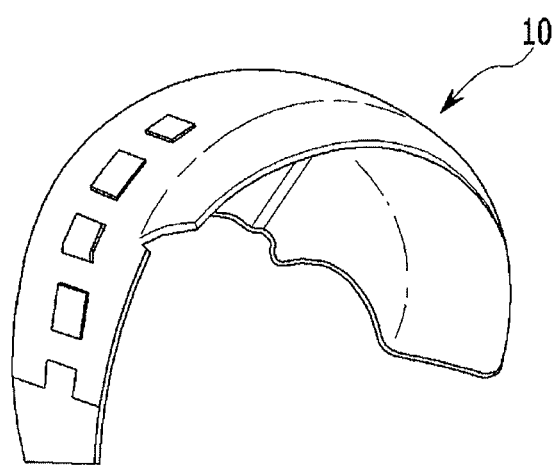
FIG. 8 is a perspective view of a wheel guard mounted on a vehicle.

FIG. 5 is a view generally showing an apparatus for manufacturing a wheel guard according to various embodiments of the present invention and a method of manufacturing a wheel guard. Referring to FIG. 5, an apparatus for manufacturing a wheel guard includes an outer layer fabric 510, an outer layer 100, a first roller R1, a second roller R2, a cooling roller CR, an adhesive layer extruder 500, a T-die 505, an adhesive layer 110, a sound-absorbing layer 120, and a sound-absorbing layer fabric 515.

The outer layer 100 forms the outer layer fabric 510 by being wound on the rollers and the sound-absorbing layer 120 forms the sound-absorbing layer fabric 515 by being wound on the rollers.

The first roller R1 and the second roller R2 are disposed in parallel with a gap therebetween and the cooling roller CR is disposed under the second roller R2. The second roller R2 and the cooling roller CR are disposed in parallel with a gap therebetween.

The outer layer 100 wound on the outer layer fabric 510 is fed to the first roller R1 and the sound-absorbing layer 120 wound on the sound-absorbing fabric 515 is fed to the second roller R2. The adhesive layer 110 is extruded through the extruder 500 and the T-die 505 and the extruded adhesive layer 110 is fed between the outer layer 100 and the sound-absorbing layer 120.

As shown in the figure, the outer layer 100, adhesive layer 110, and sound-absorbing layer 120 fed to the first roller R1 and the second roller R2 are bonded by pressure and undergo a process in which they are cooled through the cooling roller CR.

For convenience in explanation and accurate definition in the appended claims, the terms "outer" or "inner", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing a wheel guard, comprising:
   extruding an adhesive layer;
   bonding an outer layer including a non-woven fabric to a sound-absorbing layer including thermoplastic resin wherein the adhesive layer is positioned between the outer layer and the sound-absorbing layer; and
   forming the outer and sound-absorbing layers into a predetermined shape of the wheel guard, with the outer layer and the sound-absorbing layer bonded by the adhesive layer,
   wherein a heat treatment layer is formed on a non-adhesive side of the outer layer, the heat treatment layer being heat-treated and only partially melted with a heating roller, and
   wherein the outer layer and the sound-absorbing layer are bonded through the adhesive layer and subsequently cooled with a cooling roller.

2. The method of claim 1, wherein a thickness of the outer layer is 2 to 10 mm, a thickness of the adhesive layer is 0.1 to 2 mm, and a thickness of the sound-absorbing layer is 5 to 10 mm, before the bonding.

3. The method of claim 1, wherein the heat treatment layer has a fiber material, a film, or a sheet.

4. The method of claim 3, wherein the heat treatment layer includes one of thermoplastic resin, thermosetting resin, a thermoplastic compound, or a thermosetting compound.

5. The method of claim 1, wherein:
   the outer layer and the sound-absorbing layer are bonded under pressure by two rollers when being bonded through the adhesive layer, and
   the adhesive layer is integrally absorbed in the outer layer.

6. The method of claim 3, wherein a heat treatment temperature of the heat treatment layer bonded to the outer layer is higher than a melting point of the heat treatment layer.

7. The method of claim 3, wherein the heat treatment layer bonded on the non-adhesive side of the outer layer is heat-treated before the outer layer is bonded with the sound-absorbing layer.

8. The method of claim 3, wherein the heat treatment layer bonded on the non-adhesive layer of the outer layer is heat-treated after the outer layer is bonded with the sound-absorbing layer.

* * * * *